US012657111B2

(12) United States Patent
Dickinson et al.

(10) Patent No.: US 12,657,111 B2
(45) Date of Patent: **\*Jun. 16, 2026**

(54) TRANSACTION VALIDATOR

(71) Applicant: Google LLC, Mountain View, CA (US)

(72) Inventors: Adam Dickinson, Issaquah, WA (US);
James Corbett, San Jose, CA (US)

(73) Assignee: Google LLC, Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/638,082

(22) Filed: Apr. 17, 2024

(65) Prior Publication Data

US 2024/0264925 A1 Aug. 8, 2024

Related U.S. Application Data

(63) Continuation of application No. 17/666,693, filed on Feb. 8, 2022, now Pat. No. 12,001,314.

(60) Provisional application No. 63/235,396, filed on Aug. 20, 2021.

(51) Int. Cl.
| | |
|---|---|
| *G06F 11/00* | (2006.01) |
| *G06F 9/46* | (2006.01) |
| *G06F 11/3604* | (2025.01) |
| *G06F 11/3668* | (2025.01) |
| *G06F 16/21* | (2019.01) |
| *G06F 16/23* | (2019.01) |

(52) U.S. Cl.
CPC .......... *G06F 11/3612* (2013.01); *G06F 9/466* (2013.01); *G06F 11/3688* (2013.01); *G06F 11/3692* (2013.01); *G06F 16/213* (2019.01); *G06F 16/2358* (2019.01); *G06F 16/2379* (2019.01)

(58) Field of Classification Search
CPC ............. G06F 11/3612; G06F 11/3688; G06F 11/3692; G06F 11/0727; G06F 11/261; G06F 11/277; G06F 16/2379; G06F 16/213; G06F 16/2358; G06F 9/466
See application file for complete search history.

(56) References Cited

U.S. PATENT DOCUMENTS

| | | | |
|---|---|---|---|
| 7,945,657 | B1 | 5/2011 | McDougall et al. |
| 10,614,463 | B1 * | 4/2020 | Hockey .............. G06Q 20/4014 |
| 2008/0010561 | A1 * | 1/2008 | Bay ......................... H04L 67/10 |
| | | | 714/49 |
| 2013/0139130 | A1 | 5/2013 | Anjan et al. |
| 2019/0347189 | A1 | 11/2019 | Chen et al. |
| 2020/0050537 | A1 * | 2/2020 | Schmalz, Jr. ....... G06F 11/3688 |
| 2020/0409812 | A1 | 12/2020 | Wu et al. |
| 2021/0173767 | A1 | 6/2021 | Zhang et al. |

OTHER PUBLICATIONS

Corbett, et al., Spanner: Google's Globally-Distributed Database, Published in the Proceedings of OSDI, 2021, 14 pages.

\* cited by examiner

*Primary Examiner* — Joseph D Manoskey
(74) *Attorney, Agent, or Firm* — Lerner David LLP

(57) ABSTRACT

Randomized testing can be used to explore a set of possible transactions, schemas, and system states, including partionings, which can exist in a distributed database. The tests can be complementary to other system failure, performance, and version compatibility tests. Randomly generated transactions can be computed or evaluated at a transactor and compared to results derived from a transactor emulator.

20 Claims, 6 Drawing Sheets

510 — Generate a transaction

520 — Transact or evaluate one or more transactions with the transactor; write to a log 530 — Retrieve information from a log 540 — Generate a transaction from a log 550 — Perform or transact the generated transaction from the log with a transactor emulator 560 — Compare the results from the transactor and the transactor emulator

500

```
<col3 => {                                      <col3 => {
  ENUM<spandex.testv3.GlobalCornEnum>(5) | 1,     ENUM<spandex.testv3.GlobalCornEnum>(7) | 0,
  NULL | 1,                                       ENUM<spandex.testv3.GlobalCornEnum>(5) | 0,
  ENUM<spandex.testv3.GlobalCornEnum>(3) | 2,     ENUM<spandex.testv3.GlobalCornEnum>(5) | 0,
  ENUM<spandex.testv3.GlobalCornEnum>(7) | 2,     NULL | 0,
  ENUM<spandex.testv3.GlobalCornEnum>(7) | 1,     ENUM<spandex.testv3.GlobalCornEnum>(3) | 0,
  ENUM<spandex.testv3.GlobalCornEnum>(2) | 1,     ENUM<spandex.testv3.GlobalCornEnum>(7) | 0,
  ENUM<spandex.testv3.GlobalCornEnum>(5) | 1,     ENUM<spandex.testv3.GlobalCornEnum>(5) | 0,
  NULL | 1,                                       NULL | 0,
  ENUM<spandex.testv3.GlobalCornEnum>(3) | 2,     ENUM<spandex.testv3.GlobalCornEnum>(3) | 0,
  ENUM<spandex.testv3.GlobalCornEnum>(7)          ENUM<spandex.testv3.GlobalCornEnum>(7)
},                                              },
```

Fig. 6

TRANSACTION VALIDATOR

CROSS-REFERENCE TO RELATED APPLICATIONS

The present application is a continuation of U.S. patent application Ser. No. 17/666,693, filed Feb. 8, 2022, which claims the benefit of the filing date of U.S. Provisional Patent Application No. 63/235,396, filed Aug. 20, 2021, the disclosure of which is hereby incorporated herein by reference.

BACKGROUND

Databases can consist of scalable, globally-distributed databases, which can have multiple levels of abstraction. At the highest level of abstraction, the database can shard data across many sets of state machines, such as, for example, Paxos state machines, or Spanner, in datacenters which can be geographically spread regionally or globally. Replication can be used for global availability and geographic locality. Software can automatically reshard data across machines as the amount of data or the number of servers changes, and can automatically migrate data across machines, even across datacenters, to balance load and in response to failures. Such database control software can be designed to scale up to millions of machines across hundreds of datacenters and trillions of database rows.

The databases can also have software that can process "transactions" or requests which arrive at the database, such as an executor or transactor. The transactor or database can also maintain atomicity, consistency, isolation, and durability (ACID) properties. In some examples, the executor or transactor can be configured to be externally-consistent, even when receiving multiple requests or "transactions" simultaneously or near-simultaneously. For instance, the transactor may be required to handle hundreds of requests, which are submitted close in time to another, and which can be arbitrarily complicated. Further, any request can potentially transform or change the database in a manner which affects other requests. In addition, it may be desirable or required for the transactor to ensure that the features of non-blocking reads in the past, lock-free read only transactions, and atomic schema changes are met.

The operations in such databases can be logically ordered so there is a single global ordering in which the changes appear to occur to any number of independent users of the system. Even large scale operations like modifying a table or index appear to happen in a single instant which all users of the system would agree on.

In addition, the transactor and the database, which can be an SQL database, may have complex application programming interfaces (APIs). Complete unit test coverage for all the "corner cases" of SQL constructs and schema features, and their interactions, is nearly impossible. Further, Testing versions or upgrades to the transactor can require testing the software to handle the above-described transactions. However, testing the database software using the database software itself cannot guarantee a "correct" case result to a transaction or request against which the software can be tested. The database as validator would most likely agree with the database, even if the result is incorrect. In addition, the database as validator would only return one result out of the set of possible correct results, in cases like, for example SQL partial orderings, or floating point impressions.

Further, testing the entire database software can be computationally intense. In addition, testing each transaction need not require testing the entire database, which can be computationally inefficient. In addition, it is difficult or infeasible to extend the current systest framework to verify the correctness of new transactor features such as Full Text Search, Read-Your-Writes or Queues because the current integer map representation of the database is too abstract. Validating features with complex semantics, such as full text search, read-your-writes, or queues is infeasible with simpler validation models, for example integer map representations.

SUMMARY

Aspects of the disclosed technology are related to a transactor emulator and related functionality designed to test a transactor for a database. By generating transactions, running the transactions on the transactor, generating equivalent transactions from a log, and running the equivalent transactions on a transactor emulator, bugs or other errors in the transactor, or within the database system, further described herein, can be identified.

Aspects of the disclosed technology can consist of any combination of the following features, whether implemented in a system, method, or computer readable medium. Aspects of the disclosed technology include a method to test a transactor in a distributed database. The method can comprise transacting a transaction at the transactor, the transaction defining actions related to the distributed database; logging in a log, information from the transacting; generating an equivalent transaction from the log; transacting the equivalent transaction in a transactor emulator; and comparing results from the transactor and the transactor emulator. The method can comprise generating a transaction. The generation can use a seed. The seed can comprise a workid and operation number. A timestamp can be associated with logging information from the transacting. A schema change can be included with or associated with the transaction. Transacting schema changes can occur in the same log table or be logged in a separate log table. The transaction can be represented in database mutation language. A plurality of transactions can be transacted by the transactor and a plurality of equivalent transactions can be transacted by the transactor emulator. The ordering of the processing or the order in which transactions are processed can be non-deterministic. System faults can be injected into during the transacting or generating. The system faults can be any one of process crashes, file errors, corruptions, remote procedure call (RPC) delays, RPC errors, or unavailability of a server or datacenter. Comparison of the results can require an exact match for verification of the transactor. Multiple results from the transactor emulator can be used to verify the transactor. Transacting the equivalent transaction can occur on a stand-alone device. The stand-alone device need not be part of the distributed database. Transacting the equivalent transaction can utilize a database partition. A database partition can be based on the transaction.

Aspects of the disclosed technology can include a system. The system can comprise a network, the network comprising: a distributed database on one or more nodes of a network; the network configured to run a transactor on one or more nodes of the network wherein the transactor is configured to process transaction requests related to the distributed database; and a computing device comprising: a processor coupled to memory; the computing device configured to run a transactor emulator; and the transactor emulator configured to process an equivalent transaction. The computing device need not be a node of the network.

Aspects of the disclosed technology include a computer readable medium containing instructions, the instructions when run configured to perform the steps of transacting a transaction at the transactor, the transaction defining actions related to the distributed database; logging in a log, information from the transacting; generating an equivalent transaction from the log; transacting the equivalent transaction in a transactor emulator; and comparing results from the transactor and the transactor emulator.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 6 is a table illustrating example matching between a set and a result, according to aspects of the disclosure.

Figure 1:
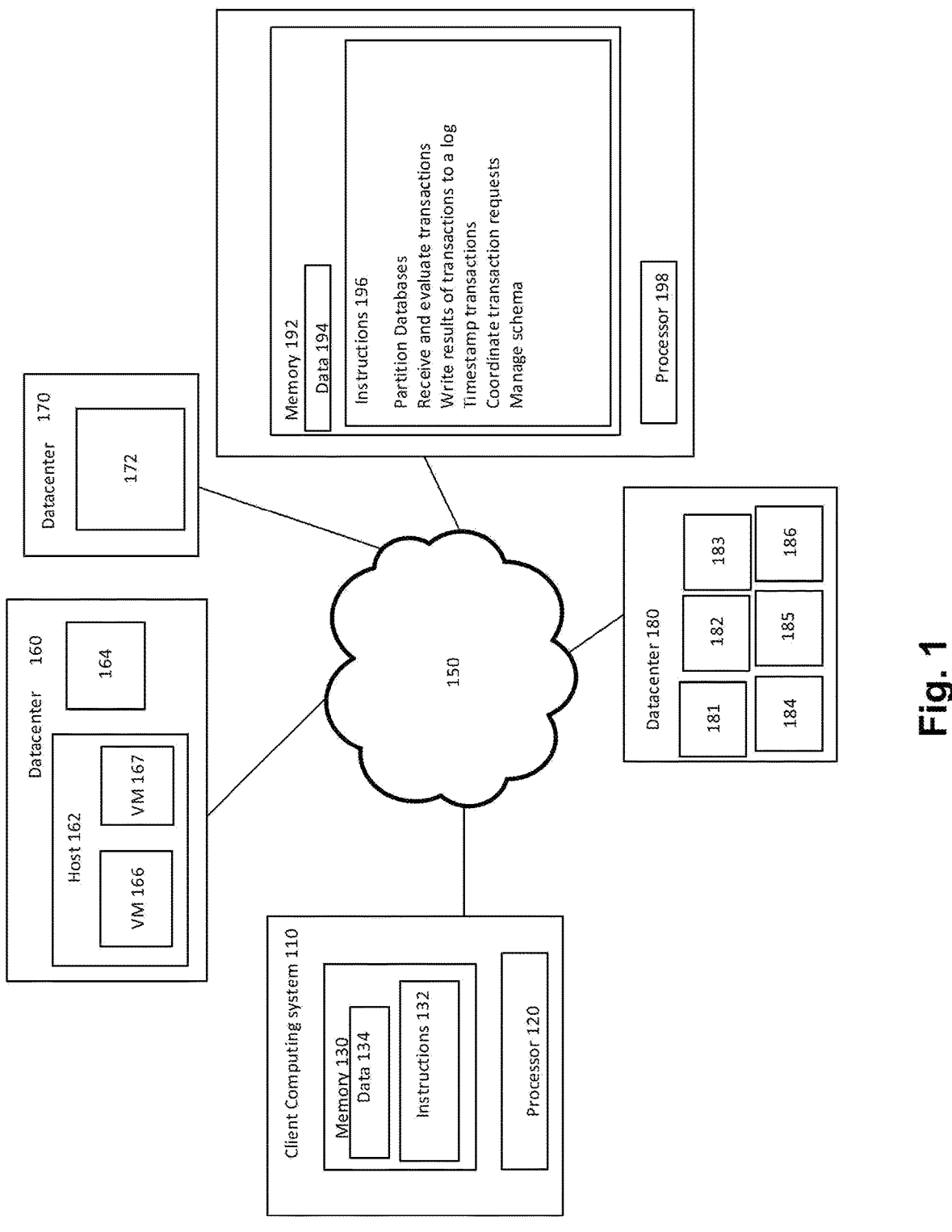
FIG. 1 is a block diagram of an example system within a distributed data store according to aspects of the disclosure.

Reference numerals that are repeated across plural figures are intended to identify the same features in various examples and figures.

DETAILED DESCRIPTION

Overview

The present disclosure provides randomized testing. Aspects of the disclosed technology enable granular testing of each transaction within a partition of a database. Each transaction can include commands, such as those written in a database manipulation language (DML), SQL, reads, writes, schema changes, or DDL.

The technology can enable the generation of a random workload, the results of which can be verified. The random workload can be made of one or more transactions, as further described below, and be verifiable. Given a particular transaction, the expected results of the transaction can be computed by the transactor emulator. The results of the transaction generated from a transactor can be written or stored in a log related to the database. The results from the transactor results can be checked against results derived from the transactor emulator. Each transaction can include multiple functions, such as read, writes, or other transformations of data within a database.

System wide testing can occur for a database and database network. The disclosed technology can include creating or injecting faults into the database. This can include faults in software components which interact with or are configured to operate in conjunction with the transactor, faults in various layers of abstraction (e.g. a virtual machine layer or level), or faults on a hardware level. For example, data in remote distributed system the database interacts with can be corrupted, parts of the distributed system can be virtually partitioned, and faults can be injected in the database system code.

A transactor emulator can be used in testing environments (e.g. system test, unit test) to calculate the correct state of a transactor results or a database after a sequence of transactions and schema changes. The transactor emulator may be "in-memory." The transactor emulator can provide a similar set of read, write, query and schema change APIs compared to the real transactor, implement self-documenting data structures to represent a database, in order to enable system tests and allowing for the implementation or testing of new features by developers on the transactor to be straightforward.

Example Systems and Methods

FIG. 1 illustrates an example system including a distributed computing environment which can contain, store, host, or manage a distributed database. A plurality of datacenters 160, 170, 180 may be communicatively coupled, for example, over a network 150. The datacenters 160, 170, 180 may further communicate with one or more client devices, such as client 110, over the network 150. Thus, for example, the client 110 may execute operations in "the cloud" or on the distributed database. In some examples, the datacenters 160, 170, 180 may further communicate with a controller 190. In some examples, a distributed database may exist on one or more of the datacenters of FIG. 1. In some examples, a distributed database may be contained in one datacenter. In other examples, the distributed database may be distributed across the system or across multiple datacenters.

Each client 110 may be a personal computer or a mobile device, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 110 may contain a processor 120, memory 130, and other components typically present in general purpose computers. The memory 130 can store information accessible by the processor 120, including instructions 132 that can be executed by the processor 120. Memory can also include data 134 that can be retrieved, manipulated or stored by the processor 120. The memory 130 may be a type of non-transitory computer readable medium capable of storing information accessible by the processor 120, such as a hard-drive, solid state drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an ASIC.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a data store as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data. Data 134 or data 194 can consist of any of the logs, entries, log scopes, partitions, or other related database data.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

The datacenters 160-180 may be positioned a considerable distance from one another. For example, the datacenters may be positioned in various countries around the world. Each datacenter 160, 170, 180 may include one or more computing devices, such as processors, servers, shards, or the like. For example, as shown in FIG. 1, datacenter 160 includes computing devices 162, 164, datacenter 170 includes computing device 172, and datacenter 180 includes computing devices 181-186. According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 1, it should be understood that any number of virtual machines may be supported by any number of host computing devices. Moreover, it should be understood that the configuration illustrated in FIG. 1 is merely an example, and that the computing devices in each of the example datacenters 160-180 may have various structures and components that may be the same or different from one another.

Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 160, 170, 180 may include any number of computing devices, and that the number of computing devices in a first datacenter may differ from a number of computing devices in a second datacenter. Moreover, it should be understood that the number of computing devices in each datacenter 160-180 may vary over time, for example, as hardware is removed, replaced, upgraded, or expanded.

Moreover, various backend systems may be built upon the distributed data store. For example, identity management systems, domain name server (DNS) setting management systems, etc. Such backend systems may to some extent be interrelated. For example, a user of the DNS setting management system may log in using an identification managed by the identity management system. In this regard, authorization parameters providing for access to such backend systems should be consistent. Accordingly, updates impacting access to one backend system, or to another part of the distributed data store, should be efficiently permeated to interrelated backend systems, thereby ensuring that authorization parameters are consistent.

In some examples, each datacenter 160-180 may also include a number of storage devices (not shown), such as hard drives, random access memory, disks, disk arrays, tape drives, or any other types of storage devices. In some examples, the storage devices or storage can occur through distributed file systems. The datacenters 160-180 may implement any of a number of architectures and technologies, including, but not limited to, direct attached storage (DAS), network attached storage (NAS), storage area networks (SANs), fibre channel (FC), fibre channel over Ethernet (FCOE), mixed architecture networks, or the like. The datacenters may include a number of other devices in addition to the storage devices, such as cabling, routers, etc. Further, in some examples the datacenters 160-180 may be virtualized environments. Further, while only a few datacenters 160-180 are shown, numerous datacenters may be coupled over the network 150 and/or additional networks.

In some examples, the controller 190 may communicate with the computing devices in the datacenters 160-180, and may facilitate the execution of programs. For example, the controller 190 may track the capacity, status, workload, or other information of each computing device, and use such information to assign tasks. The controller 190 may include a processor 198 and memory 192, including data 194 and instructions 196, similar to the client 110 described above.

The controller 190 may be configured to maintain consistency throughout the distributed data store. In some examples, the controller can ensure that every transaction received at the database is related to a timestamp, and that all queries or reads to the database at an arbitrary timestamp will reflect all committed transactions up until that timestamp. As further explained below, this property of timestamps can allow for the validation of read/query results. One of the groups described below can be chosen to have the role of a coordinator or a controller.

In some examples, such as when a database is replicated or distributed, the database can be divided into groups, and each group can be associated with or may contain a transaction manager, in order to support distributed transactions. In some examples, if a transaction includes only one group the transaction manager can be bypassed. In other examples, if the transaction involves more than one group, one or more transaction managers can coordinate the transaction being transacted or completed. In some example, a transaction manager or coordinator can be chosen independently out of the participants for that transaction.

Client 110, datacenters 160-180, and controller 190 can be capable of direct and indirect communication such as over network 150. For example, using an Internet socket, a client 110 can connect to a service operating on remote servers through an Internet protocol suite. The network 150, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71*b, g, n*, or other such standards), and RPC, HTTP, and various combinations of the foregoing. Such communication may be facilitated by a device capable of transmitting data to and from other computers, such as modems (e.g., dial-up, cable or fiber optic) and wireless interfaces.

Client 110 may request access to the database through submission of a transaction. Such a transaction or request may be handled by the controller 190 and/or one or more of the computing devices in datacenters 160-180. By way of example only, a request to read and write data within a database may be received by host computing device 162. In response, computing device 162 commits a read to the data store and also submits a write to a particular section in the data store or distributed database. The controller 190 may be aware of this high level functionality. Controller 190 can have the functionality of various software components further described herein with respect to FIGS. 2-6.

Distributed database or distributed datastore store and backend systems built upon such data stores may implement induction schemas or manifest files for internal consistency. For example, backend systems such as identity management systems, authorization systems, systems for managing DNS settings, etc. may implement induction schemas or manifest files.

The database can be a multi-version, globally distributed, and synchronously-replicated database. In addition, the database can support externally-consistent distributed transactions. In addition, the distributed system can support APIs which can expose clock uncertainty related to requests or transactions arriving at the database or server. In addition, it can be desirable for the system to support external consistency and include non-blocking reads in the past, lock-free read-only transactions, and atomic schema changes across the entire database. The transactor or database can also maintain atomicity, consistency, isolation, and durability (ACID) properties. In addition, SQL semantics, such as DML or Data Definition Language (DDL) etc. can also be supported by the database.

According to one aspect of the disclosure, multiple requests or transactions can be submitted to the distributed database system by one or more clients.

Figure 2A:
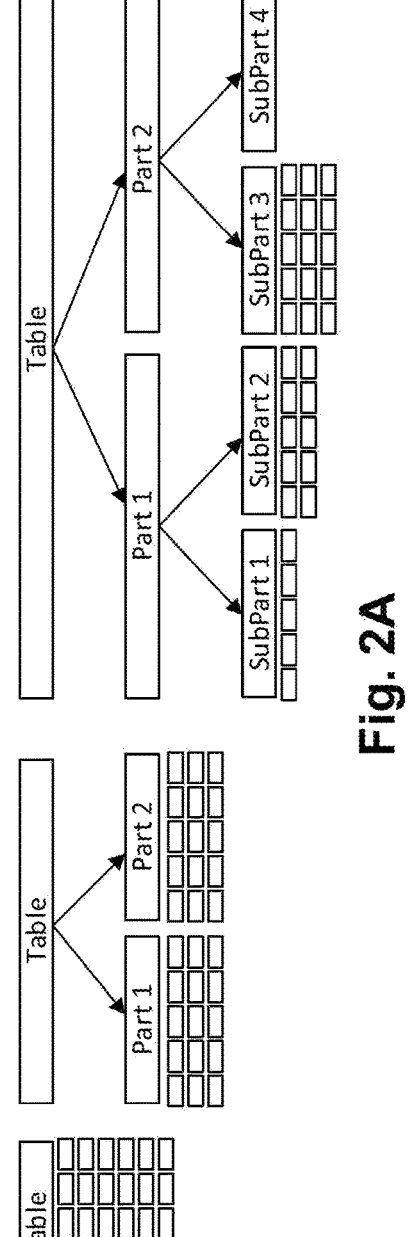
FIGS. 2A and 2B illustrate aspects of a database according to aspects of the disclosure.
Figure 2B:
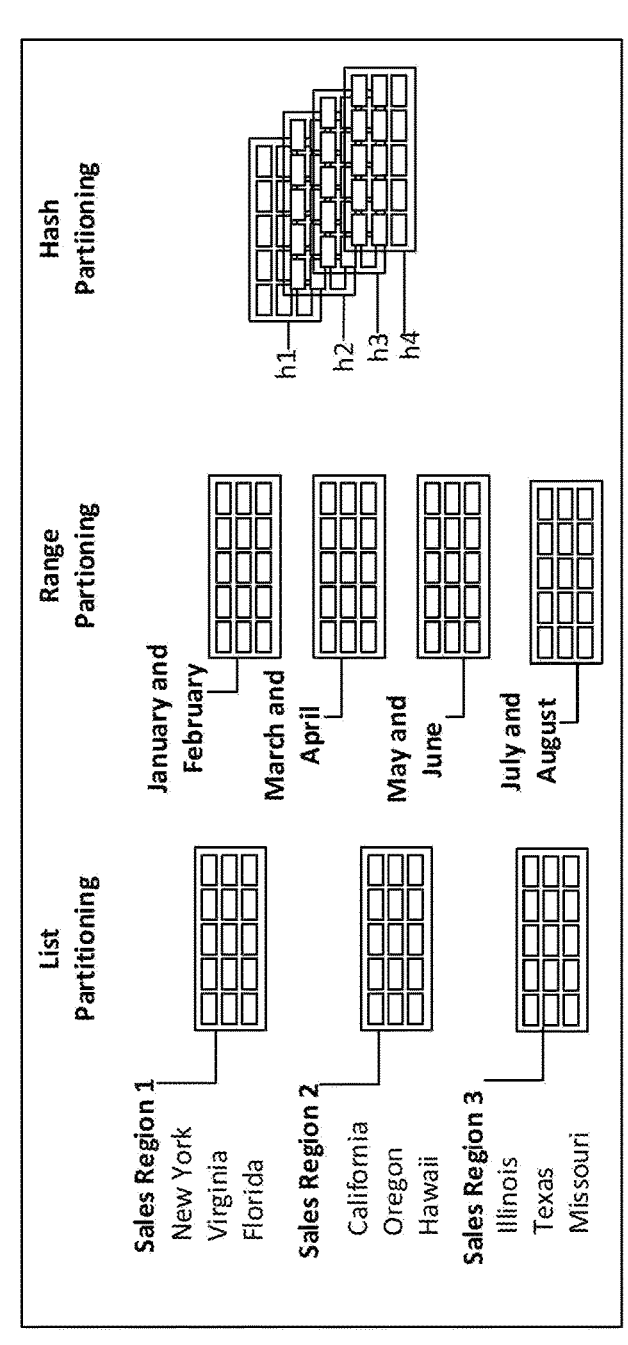

FIGS. 2A and 2B illustrate a schematic view of data stored within a database. Although not illustrated in FIGS. 2A and 2B, the database can be stored in multiple ways on different physical units. For example, data may be physically isolated on all the servers within a datacenter. In other examples, different data may be isolated on different servers within one datacenter or across multiple datacenters.

The database can be divided or partitioned in multiple ways.

FIGS. 2A and 2B also include a log table. In some examples, every transaction which modifies a table or information in a database can include an extra "write" to a log, which can add a log row adding that write.

The database can also be partitioned into logscopes, which can be validated separately. Log scopes are the unit of sharding for validation. All transactions that write to a log scope will write a log for that log scope in the log table, and thus we can reconstruct the state of a log scope by reading only its logs. In some examples, the data in a log scope can be small enough to easily fit into the memory of a device running a transaction emulator.

Figure 3:
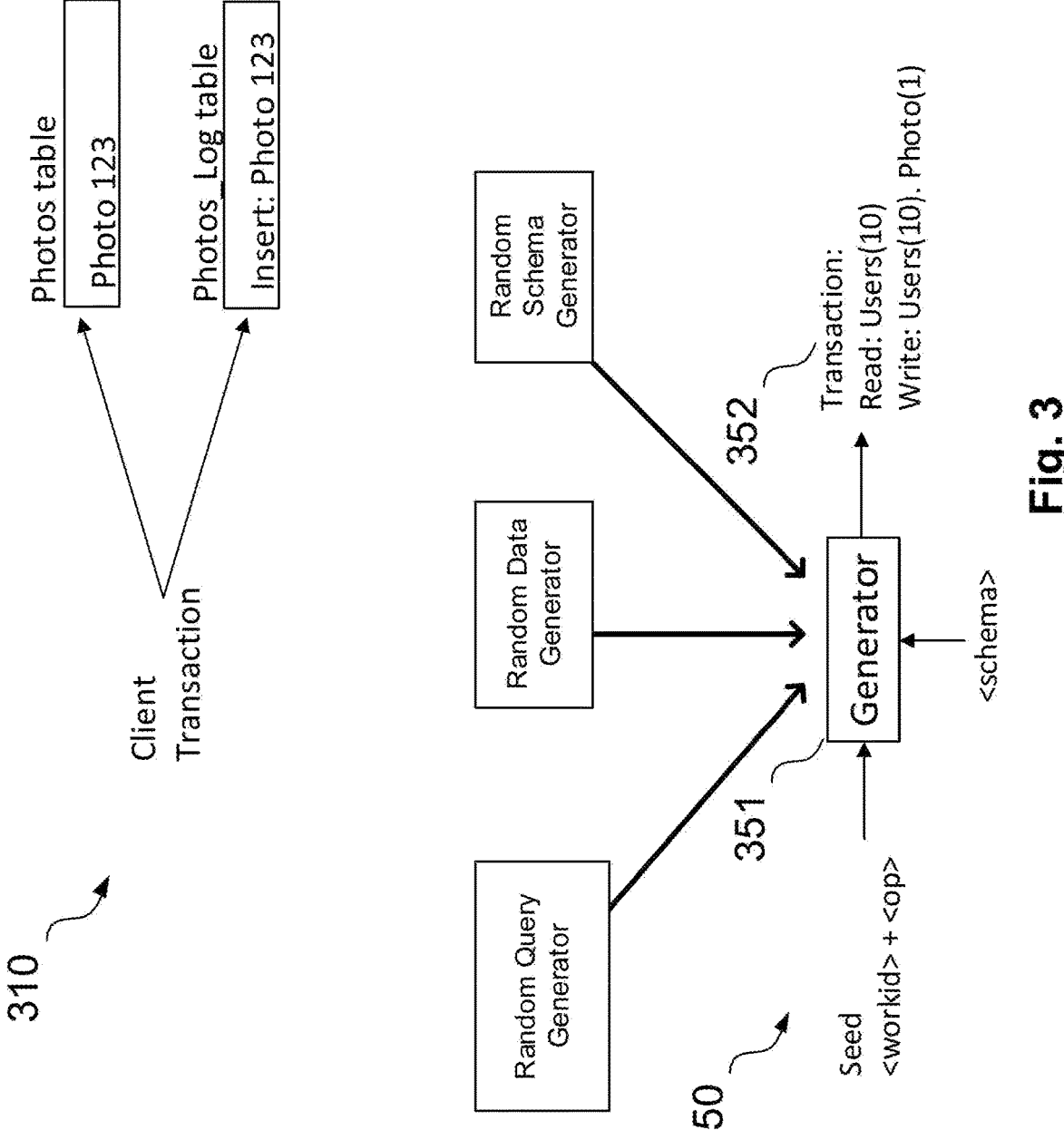
FIG. 3 illustrates an example transaction or request within a database according to aspects of the disclosure.

FIG. 3 illustrates example transactions and generation of a transaction from a generator.

FIG. 3 illustrates a transaction 310. A transaction can be thought of or modeled as a sequence of actions or commands. In some examples, the generated transactions can be assembled from a sequence of randomly generated actions or commands. Transaction 310 for example can indicate a command to insert a photo 123 into a table of photos, and also generate an addition into the log table for a partition related to photos. A transaction can describe or encode operations to perform, and can encode a sequence of reads queries, writes, and DML updates, along with execution options. DML and SQL collectively can act as Create (DML Insert), Read (SQL), Update (DML update), Delete (DML delete) (CRUD).

In some examples, a complex action generator such as a Random Query Generator (RQG) can be used. The RQG can generate random SQL queries and DML statements. The RQG can use reflection on the database schema to understand the functions, operators, types and relationships between tables, so the vast majority of statements it generates are valid. In some examples, reads and writes can be generated using simpler generators that read and/or mutate random columns of randomly selected rows with random values.

Data which is used in connection with a generated RQG can include random data, such as rows or values, selected using a random data generator (RDG). As entirely random values may cause certain transactions to fail due to constraints placed on the data by the type of operation or schema used, the RDG can choose acceptable values which are within the constraints. As one example, an "Update" mutation or command requires that a target row already exists, so the write generator will ask the RDG for the key of an existing row for use in these mutations or commands. As another example, choosing a value for a column for which there is a unique index requires that the value not exist in any other row. An index can be a data structure that can improve the speed of data retrieval operations on a database table. Indexes can be used to quickly locate data without having to search every row in a database table each time a database table is accessed. The RDG can extract a set of constraints from the schema, the actions in the transaction, and a sample/range of the current table contents, and then use a constraint solver to compute a set of values satisfying the constraints, if possible, and fall back on random values if a solution cannot be found within a predetermined time period. The constraint solver can be for example, a Satisfiability modulo theory (SMT) solver or other constraint programming solver.

In addition to the above, random schema changes for the transaction or transactor can be generated using a random schema generator (RSG). For example, the RSG can take the current schema and produce a series of random modifications to it, e.g., adding/dropping tables/columns/indexes, adding/dropping check/foreign key constraints, or modifying various schema options. The change statements themselves are typically valid, but can fail depending on the contents of the database, such as for example, when adding a unique index requires the indexed values already be distinct. In some examples, the data generator can be used to generate data which can conform to a constraint that may be desired to be tested in the future. The data can then be subjected to an impractical schema change.

In some examples, certain transactions can be given priority or receive special treatment. For example, a read-only transaction can be a transaction which only reads data from the database and has no write functionality. In some examples, a read-only transaction must be predeclared as not having any writes. Reads in a read-only transaction can execute at a system-chosen timestamp without locking the system or database, so that incoming write transactions on the distributed database are not blocked. The execution or of the reads in a read-only transaction can proceed on any replica of the distributed database that is sufficiently up-to-date In addition to the above described functionality, API calls can be generated to change the manner in which partitioning or replication of tables or other elements of a database. Due to the complexity of executing transactions on large distributed databases which relies on the distribution of data across multiple servers, and the coordination required between those components to act as a single database, the addition or insertion of API calls during the checking of generated transactions can provide additional testing on a system level.

FIG. 3 also illustrates in block 350 the generation of a transaction from a seed. The seed can include a work identifier or workid and an operation number, which can be provided to a generator 351, to generate a transaction 352. The workid and operation number together can be a seed which is used for transaction generation. The transaction can include multiple steps or sequences which need to be executed. Each seed can generate a unique translation. For example, the "space" of these seeds can be sufficient to generate a very large number of unique transactions, such as, for example, at least 2^64.

Figure 4:
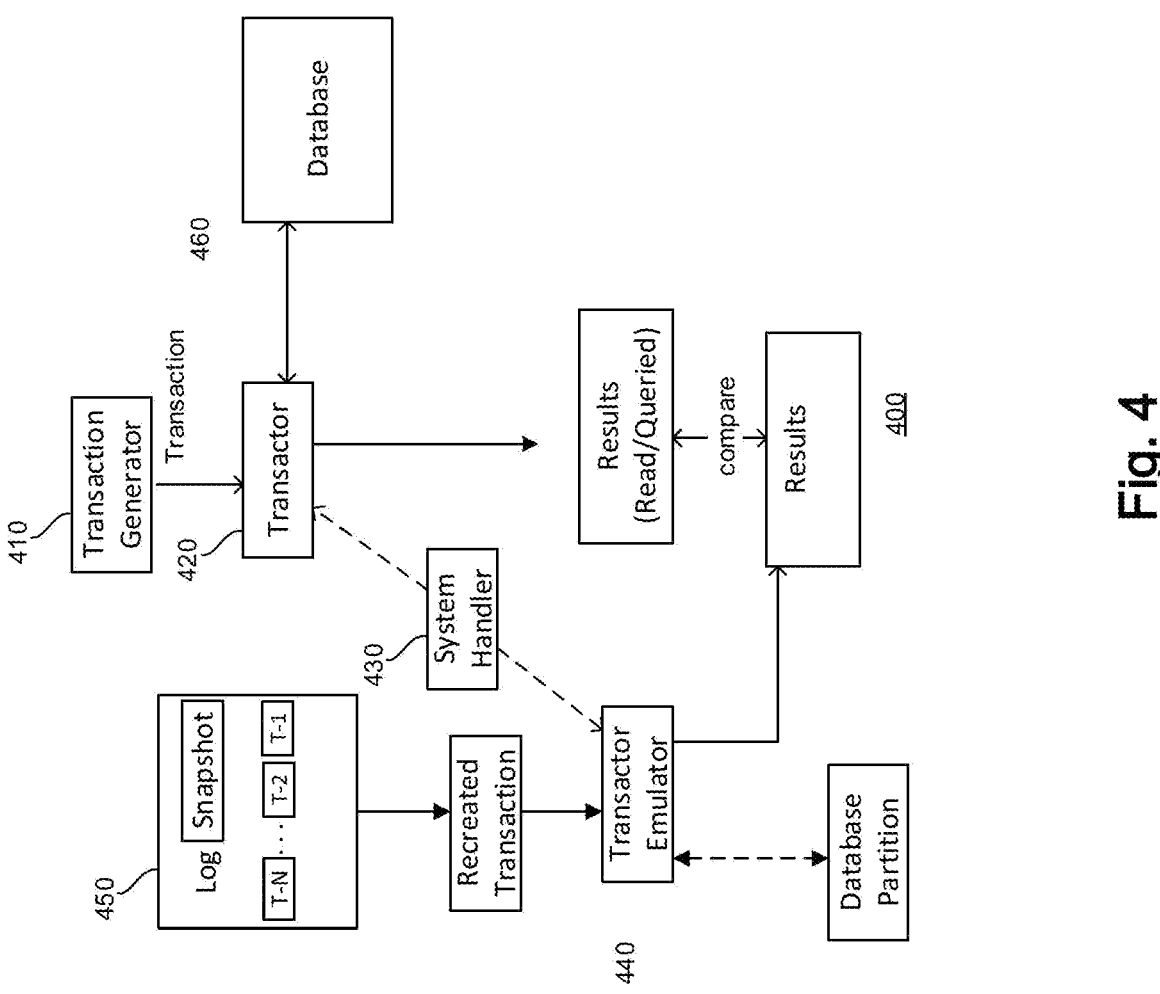
FIG. 4 illustrates aspects of a framework 400 according to aspects of the disclosure.

FIG. 4 illustrates an example framework 400. Framework 400 can be used to test or validate new versions of transactors 420 on a test set of transactions across a variety of circumstances, including distributed computing systems.

FIG. 4 illustrates one or more transaction generators 410, transactors 420, system handlers 430, transactor emulator 440, log 450, and database 460.

Transaction generators 410, such as those described with respect to FIG. 3, can generate one or more transactions. The generated transactions can be similar to, for example, transactions described with respect to FIG. 3, such as transaction 352 or transaction 310. In some examples, transaction generators can randomly generate transactions. A generated transaction can be thought of as a message output by a transaction generator 410 describing a transaction to perform, and encodes a sequence of reads queries, writes, and DML updates, along with execution options. In some examples, each generator can use a pseudo random generator seed based on the workid and operation.

Transactors 420 can be software capable of executing the transactions with respect to the database 460. Transactors can take the transaction request and execute the request to make changes or mutations in the database, such as for example, writing data to the database, such as in a row or column, swapping rows or columns, or reassigning data.

Transactor emulator 440 can be a "light" version of a transactor, which can enable the verification of the results of a single transaction when that single transaction is performed by transactor 420. Transaction emulator 440 can contain a subset of the functionality of transactor 420. For example, the transactor may only implement or contain a data model, including a schema and current content of tables and indexes, but for example, may not contain or implement other functionality related to concurrency, distribution, replication, or the interfaces to low level storage. In some examples, transaction emulator 440 can be considered to be an oracle for software testing. In some examples, transaction emulator 440 can run on a single "node" or a single device or computing system with fewer hardware resources being required as only a subset of the database is required to run transactions.

In some examples, as modifications, features, elements, or changes are made to transactors 420, equivalent or similar changes can be made to transactor emulator 440 to enable the transactor emulator 440 to act as a "check" to the changes made in transactor 420.

Further, as transactor emulator 440 is simpler than transaction 420, results from the spanner can be trusted to be correct. As an example, while a "join" or "SQL join" command conducted by transactor 420 may involve selecting an up-to-date replica of data, streaming results between various processes that are operational or operating till the timestamp of the "join" operation, dealing with cases where a particular process or request has failed. In contrast, the transaction emulator may only have to deal with or act on a subset of the data that relate to the transaction.

In some examples, the results from transaction emulator 440 need not be exactly the same as the results from transactor 420. For example, in some cases, such as for SQL queries, transaction emulator can compute a representation of all possible results. Some SQL constructs may not precisely determine the ordering of their results, but can represent all valid partial orderings for result matching with the results of transactor 420. Other SQL constructs (e.g., the RAND( ) function or a LIMIT without a sort) can produce non-deterministic results. In the cases of non-determinstic results, any possible result can be accepted. In some examples, floating point errors or other. The table in FIG. 6 illustrates example matching between a set and a result.

Aspects of the disclosed technology can include a set of transaction generators, which can generate pseudo-random transactions from a seed or other input, such as a workid of a handler and an integer op number.

A set of systest handlers, which use the transaction generators to create transactions and execute these transactions against a systest Spanner database. For each transaction that modifies the database, we also write a log summarizing the mods. A transaction emulator can include an API covering the data model of Spanner. The emulator will allow simulated execution of writes, reads, queries, and schema changes for validating the results of reads and queries against a systest Spanner database. A set of validators, which can read the logs written during transaction execution and use them to compute the expected state of (a part of) the database using MiniSpanner.

Figure 5:
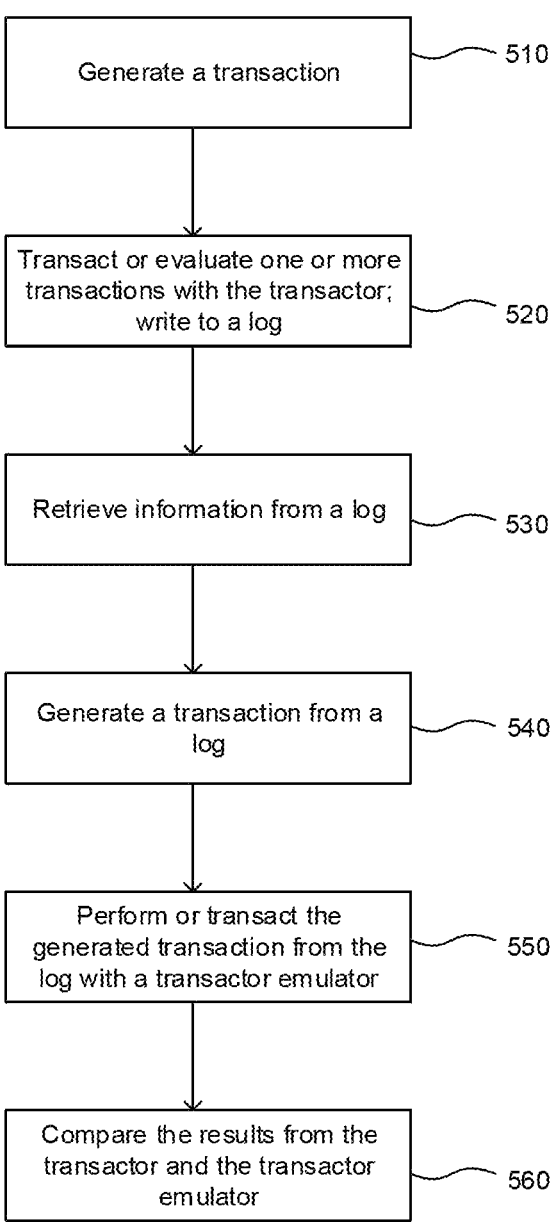
FIG. 5 illustrates a method 500 according to aspects of the disclosure.

FIG. 5 illustrates an example method 500. While the operations of method 500 are described below in a particular order, it should be understood that the order may be modified or operations may be performed simultaneously. Additionally, operations may be added or omitted. Method 500 can be considered to be a parallel emulation test structure. In some examples, method 500 can run on single transactions.

At block 510, a transaction can be generated. For example, FIG. 3 describes the generation of multiple transactions.

At block 520, a transactor can transact or evaluate the transaction which has been generated. For example, a transactor similar to transactor 420 can transact the transaction generated.

At block 530, a log can be retrieved. The log can be related to the transaction which was transacted at block 520.

At block 540, a transaction can be generated from a log. Logs or log data can contain the data that may be required to determintically recreate a transaction which was executed. The log can include for example, work id, operation number, schema version, commit timestamp, and log scope. This information can be used to "seed" or provide an input to a generator and initialize the inputs in the generator to recreate the exact transaction which was executed by transactor 420 without the need to write verbose data into the log.

At block 550, a transactor emulator can receive and perform the transaction generated at block 540.

At block 560, the results of the transaction can be compared. If the results described above match, or are within an acceptable range of one another, the transactor is considered to be valid for the particular transaction which was tested. The test is considered to fail if the values do not match. Acceptability can be determined based on the error bound of floating point or other imprecise calculations. In other examples, the result ordering can be validated to be a valid partial ordering based on the query. If the results are not a match, or not within some error bound or "close" to one another, a bug or other issue can be identified in the transactor.

In some examples, additional operations or events can occur during or between the blocks described above. For example, a random schema change or changes to the partitioning of the data can occur.

In some examples, the randomness of method 500 can be pseudorandom in that a seed can be chosen to generate the transactions for method 500 can be chosen randomly at the start of the test. The workid and operation number can form the seed. If method 500 fails, the seed used to generate the transactions can be used again to rerun the same sequence of transaction for reproducing the failure.

In some examples, one or more steps of method 500 can be performed concurrently on multiple transactions. Multiple transactions can be used on multiple threads or processors executing random transactions in parallel against the same database. The threads can be uncoordinated with one another. Stated in another way, each thread or transaction can be completely random from another transaction. Any threads can execute a transaction that reads/writes any row of any table within a database at any time.

In order to accomplish the validation of multiple transactions, transaction logging can be used. In this approach, a special log table can be added to a schema, and that log table can be configured so that it is never changed by the random transactions which are generated or used. When a transaction is a mutating transaction which mutates the database, an extra mutation can be added to the transaction which can record the transaction's key value, and commit timestamp to a log table. The log can be written if and only if the transaction has been committed to the database by execution of the transaction at the transactor. In some examples, the transaction's key value can consist of the seed value (work id and operation number), commit timestamp, schema version, and log scopes or partitions affected by the transaction. As transactions can "commit" or be aborted, when a transaction aborts, it can be required that no transactions ever "read" the changes that were made by that transaction as it was never fully completed or "committed." A row can be added in the log table in the generated transaction and the transactor will only add that row when the transaction commits. The transactor also logs the timestamp that both the generated and the log parts of the transaction are committed to the log table, which can be used during the "playback" or recreation of the transaction when generating the state of the database at a given timestamp.

To verify or validate that the transactor has correctly executed the transaction, the following can be performed with respect to the transactor emulator. All logs in the log table up until the point of a commit timestamp of that transaction can be read. The logs can be replayed in their commit timestamp order on the transactor emulator. As the log contains each transaction's "key," the log can be used to regenerate the actions, mutations, or changes the transaction made to the database. The actions, mutations, or changes can be run on the transaction emulator, and the set of results from the transactor and the transaction emulator can be compared.

In addition to verification, this test can also include performing schema changes while the transactions are occurring. Schema changes can occur atomically at a specific time, which can be indicated by a specific timestamp within a log. Schema changes can be logged in a separate log table, and when transactions are "replayed" as described above, the schema changes can also be inserted or replayed based on the timestamps associated with the schema changes.

Further, as multiple transactions can be non-deterministic from the point of view of scheduling of the transactions, failures can be unique or inconsistently produced.

In some examples, a production version of a transactor intended to be used in a production environment can be tested using method 500. In a production environment, it is possible that multiple replicas of data are available across multiple machines or instances. In such examples, additional "production" level tests can be performed. For example, random transactions or tests can be generated, including transactions, schema changes, partitioning changes, replication changes, as well as faults injected or introduced to represent issues with the underlying database or systems, such as process crashes, file errors, corruptions, remote procedure call (RPC) delays, RPC errors, unavailability of a server or datacenter. In some examples, a test can be configured to be run on hundreds of thousands, millions, or even a larger number of transactions.

In some examples, the above described production version can be ran across many threads across many transaction emulators which can be running on separate machines. The transaction emulators need not be coordinated with one another.

As the size of the database generated by a large number of writes from many clients can be too large to fit into the memory of a machine running a single transactor emulator, such as an individual machine, a logical partition of a database into one or more log scopes can be created. Each log scope can be related to or contain its own log table, and the state of a log scope can be reconstructed by replying only the logs for a particular log scope. In some examples, a "sharded" validation or test process can consist of (1) partitioning the database into log scope and creating log tables, and (2) executing a mutating transaction, and adding extra mutation(s) recording the transaction's key and commit timestamp to each log table whose log scope was changed or mutated by the transaction.

After a transaction is committed that has a read or a query, the following can occur: (1) reading all the logs for the log scopes that were read/queried, up through the commit timestamp of the transaction, (2) replaying the logs, in commit timestamp order, on a transactor emulator, and (3) running the read/query on the transactor emulator and comparing the results to those returned by transactor.

In some examples, "batch validation" can take place. In such examples, the validity of the entire system can be checked for consistency and correctness at a single time-stamp through a coordinate distributed algorithm. A distributed algorithm is an algorithm designed to run on computer hardware constructed from interconnected processors. In some examples, distributed algorithms can run in parallel or execute concurrently, with separate part of the algorithm running simultaneously on independent processors. The independent processors may have limited information about what the other parts of the algorithm are performing or processing.

A "checkpoint" can be written for each log scope which is considered "true" or "correct" after a batch validation is done. In such a case, that checkpoint can be considered to be a proper starting point, and validation only need to be done from that checkpoint onwards. In this manner, transansactions from that checkpoint onwards can be run and validated. Once validated, the new checkpoint can be saved into a log scope. In some examples, batch validation can take place at a fixed time interval or after a fixed number of transactions occur.

As used in this disclosure, transactor or refers to a host can be a server or computer, or a software running thereon, such as for example computing system 110, or any combination of components described with respect to computing system 110, which can for example, control, add information to, perform read or write operations, or operate in conjunction with storage or memory. In some examples, applications can run on the host.

While this disclosure contains many specific implementation details, these should not be construed as limitations on the scope of what may be claimed, but rather as descriptions of features specific to particular examples. Certain features that are described in this specification in the context of separate examples may also be implemented in combination in a single implementation. Conversely, various features that are described in the context of a single implementation may also be implemented in multiple examples separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the examples described in this disclosure may be readily apparent to those skilled in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

The invention claimed is:

1. A method to test a transactor in a distributed database, the method comprising:
transacting a first transaction at the transactor, wherein:
the first transaction includes a schema change, or
the first transaction is represented in database mutation language;
logging in a log information resulting from transacting the first transaction;
generating an equivalent transaction based on the information in the log;
transacting the equivalent transaction in a transactor emulator to generate transaction results; and
comparing the information resulting from transacting the first transaction and the transaction results from the equivalent transaction to verify an execution of the transaction by the transactor.

2. The method of claim 1, further comprising generating, using a seed, the first transaction or the equivalent transaction.

3. The method of claim 2, wherein the seed comprises a workid and operation number.

4. The method of claim 1, wherein a timestamp is associated with logging the information resulting from transacting the first transaction.

5. The method of claim 1, wherein transacting schema changes are logged in a second log.

6. The method of claim 1, wherein a plurality of transactions are transacted by the transactor and a plurality of equivalent transactions are transacted by the transactor emulator.

7. The method of claim 6, wherein an ordering of processing the plurality of transactions is non-deterministic.

8. The method of claim 1, further comprising injecting system faults into the first transaction during the transacting or generating of the first transaction.

9. The method of claim 8, wherein the system faults can be any one of process crashes, file errors, corruptions, remote procedure call (RPC) delays, RPC errors, or unavailability of a server or datacenter.

10. The method of claim 1, wherein comparison of the results requires an exact match for verification of the transactor.

11. The method of claim 1, wherein multiple results from the transactor emulator can verify the transactor.

12. The method of claim 1, wherein the transacting the equivalent transaction occurs on a stand-alone device.

13. The method of claim 1, wherein transacting the equivalent transaction utilizes a database partition.

14. The method of claim 13, wherein the database partition is based on the first transaction.

15. The method of claim 1, further comprising generating the first transaction, wherein the first transaction is generated by the transactor or a transaction generator.

16. A system comprising:
a network, the network including a distributed database on one or more nodes of the network;
a transactor configured to execute on one or more nodes of the network, wherein the transactor is further configured to:
process a first transaction, wherein:
the first transaction includes a schema change, or
the first transaction is represented in database mutation language; and
a computing device comprising one or more processors, wherein the computing device is configured to run a transactor emulator, wherein the transactor emulator is configured to:

process an equivalent transaction, compare information from resulting from processing the first transaction and transaction results from processing the equivalent transaction to verify the execution of the first transaction by the transactor.

17. The system of claim 16, wherein the computing device is not a node of the network.

18. One or more non-transitory computer readable medium containing instructions, the instructions when run configured to perform the steps of:

transacting a first transaction at a transactor wherein:

the first transaction includes a schema change, or the first transaction is represented in database mutation language;

logging in a log information resulting from transacting the first transaction;

generating an equivalent transaction based on the information in the log;

transacting the equivalent transaction in a transactor emulator to generate transaction results; and comparing the information resulting from transacting the first transaction and the transaction results from the equivalent transaction to verify an execution of the transaction by the transactor.

19. A method to test a transactor in a distributed database, the method comprising:

generating, using a seed comprising a workid and an operation number, a first transaction;

transacting the first transaction at the transactor;

logging in a log information resulting from transacting the first transaction;

generating an equivalent transaction based on the information in the log;

transacting the equivalent transaction in a transactor emulator to generate transaction results; and comparing the information resulting from transacting the first transaction and the transaction results from the equivalent transaction to verify an execution of the transaction by the transactor.

20. A method to test a transactor in a distributed database, the method comprising:

transacting a plurality of transactions at the transactor, wherein an ordering of processing the plurality of transactions is non-deterministic;

logging in a log information resulting from transacting the plurality of transactions;

generating a plurality of equivalent transactions based on the information in the log;

transacting the plurality of equivalent transactions in a transactor emulator to generate transaction results; and comparing the information resulting from transacting the plurality of transactions and the transaction results from the plurality of equivalent transactions to verify an execution of the plurality of transactions by the transactor.

* * * * *